United States Patent
Kelly

(10) Patent No.: US 10,937,125 B2
(45) Date of Patent: Mar. 2, 2021

(54) RESOURCE-UTILIZATION-BASED WORKLOAD RE-ALLOCATION SYSTEM

(71) Applicant: Dell Products L.P., Round Rock, TX (US)

(72) Inventor: John Kelly, Mallow (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/502,906

(22) Filed: Jul. 3, 2019

(65) Prior Publication Data

US 2019/0325554 A1 Oct. 24, 2019

(51) Int. Cl.
| | |
|---|---|
| *G06F 15/80* | (2006.01) |
| *G06T 3/00* | (2006.01) |
| *G06T 15/40* | (2011.01) |
| *H04N 13/128* | (2018.01) |
| *H04N 13/351* | (2018.01) |
| *H04N 13/122* | (2018.01) |

(Continued)

(52) U.S. Cl.
CPC .......... *G06T 3/0087* (2013.01); *G06T 15/405* (2013.01); *H04N 13/122* (2018.05); *H04N 13/128* (2018.05); *H04N 13/239* (2018.05); *H04N 13/351* (2018.05); *G06T 2215/16* (2013.01); *H04N 2013/0081* (2013.01)

(58) Field of Classification Search
CPC .... G06F 9/4881; G06F 9/505; G06F 11/3006; G06F 11/3051; G06F 2209/485; G06F 2209/5022; G06F 2209/508; G06F 9/5027; G06F 9/5083; G06F 9/50; G06F 12/02; G06F 15/80; G06T 2215/16
See application file for complete search history.

(56) References Cited

U.S. PATENT DOCUMENTS

| | | | | |
|---|---|---|---|---|
| 2014/0181807 | A1* | 6/2014 | Fonseca | G06F 9/45558 718/1 |
| 2017/0256018 | A1* | 9/2017 | Gandhi | G06T 1/20 |
| 2020/0142753 | A1* | 5/2020 | Harwood | G06F 9/45558 |

OTHER PUBLICATIONS

Hari Sivaraman, Uday Kurkure, and Lan Vu, "VMware VROOM! Blog—Machine Learning on vSphere 6 with Nvidia GPUs—Episode 2," 2019, 11 Pages, VMware, Inc.; https://blogs.vmware.com/performance/2017/03/machine-learning-vsphere-6-5-nvidia-gous-episode-2.html.

* cited by examiner

*Primary Examiner* — Hua H Nguyen
(74) *Attorney, Agent, or Firm* — Haynes and Boone, LLP

(57) ABSTRACT

A resource-allocation-based workload re-allocation system includes a computing device with a GPU processing system including GPU processing subsystems, and a GPU memory system including a respective GPU memory subsystem utilized by each GPU processing subsystem. A resource utilization monitoring and workload re-allocation system that is coupled to the computing device identifies graphics workloads that are each allocated a respective memory capacity provided by one of the GPU memory subsystems and, for each of those graphics workloads, determines a respective GPU memory subsystem utilization of the respective memory capacity allocated to that graphics workload. Based on the respective GPU memory allocation utilizations, at least some of the plurality of graphics workloads are re-allocated by the resource utilization monitoring and workload re-allocation system from a first GPU memory subsystem to at least one different GPU memory subsystem, and memory capacity provided by the first GPU memory subsystem is allocated to non-graphics workload(s).

20 Claims, 8 Drawing Sheets

(51) Int. Cl.
*H04N 13/239* (2018.01)
*H04N 13/00* (2018.01)

RESOURCE-UTILIZATION-BASED WORKLOAD RE-ALLOCATION SYSTEM

BACKGROUND

The present disclosure relates generally to information handling systems, and more particularly to re-allocating workloads provided by an information handling system based on the resource utilization of those workloads.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include processing systems that may provide parallel processing capabilities that allow for their use in multiple applications. For example, Graphics Processing Units (GPUs) included on GPU cards in information handling systems may be utilized to perform graphics workloads that provide for graphics acceleration, as well as non-graphics workloads that provide for Artificial Intelligence (AI) operations, Machine Learning (ML) operations, and/or Deep Learning (DL) operations. One specific example of current graphics workloads provided by GPU cards is the use of computing devices/GPU card by a business to perform graphics acceleration utilized with Virtual Desktop Infrastructure (VDI) environments to provide virtual desktops with enhanced video, animation, and/or other graphics elements in a manner that is desirable to employees and other users in the business (i.e., "smooth" graphics elements that do not "stutter" or otherwise operate in a manner that is not expected by the user.)

Recent GPU card use trends also see those businesses attempting to utilize their GPU cards to perform non-graphics workloads that include the AI operations, ML operations, and/or DL operations discussed above, which allow the GPU cards that provide the VDI environments discussed above to also be utilized to perform the AI operations, ML operations, and DL operations that may include, for example, analytics on customer data, image matching, deep learning for weather forecasting, and/or a variety of other AI operations, ML operations, and/or DL operations known in the art. In order to ensure that the VDI environments provided via the graphics workloads performed by the GPU cards are not negatively affected, the AI operations, ML operations, and/or DL operations provided via the non-graphics workloads are performed by the GPU cards when the VDI environments are not needed. For example, the VDI environments may be needed for virtual desktops provided to employees of the business during business hours, and thus their associated graphics workloads may be performed during those business hours by the GPU cards, while the non-graphics workloads may be performed by those GPU cards outside of business hours when the VDI environments are not needed. However, as companies become global, the concept of business hours and non-business hours disappears (e.g., because the business may have employees in different countries and thus may always include some employees that require use of VDI environments around the clock). Furthermore, even in situations where the concept of business hours and non-business hours is valid, it has been found that the conventional scheduling of graphics workloads and non-graphics workloads discussed above results in inefficient GPU card resource utilization.

Accordingly, it would be desirable to provide an improved workload allocation system.

SUMMARY

According to one embodiment, an Information Handling System (IHS) includes a processing system; and a memory system that is coupled to the processing system and that includes instructions that, when executed by the processing system, cause the processing system to provide a resource utilization monitoring and workload re-allocation engine that is configured to: identify a plurality of graphics workloads that are each allocated a respective memory capacity provided by one of a plurality of Graphics Processing Unit (GPU) memory subsystems included in a GPU memory system; determine, for each of the plurality of graphics workloads, a respective GPU memory subsystem utilization of the respective memory capacity allocated to that graphics workload; cause, based on the respective GPU memory subsystem utilization determined for each of the plurality of graphics workloads, a re-allocation of at least some of the plurality of graphics workloads from a first GPU memory subsystem included in the GPU memory system to at least one different GPU memory subsystem included in the GPU memory system; and cause memory capacity provided by the first GPU memory subsystem to be allocated to at least one non-graphics workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
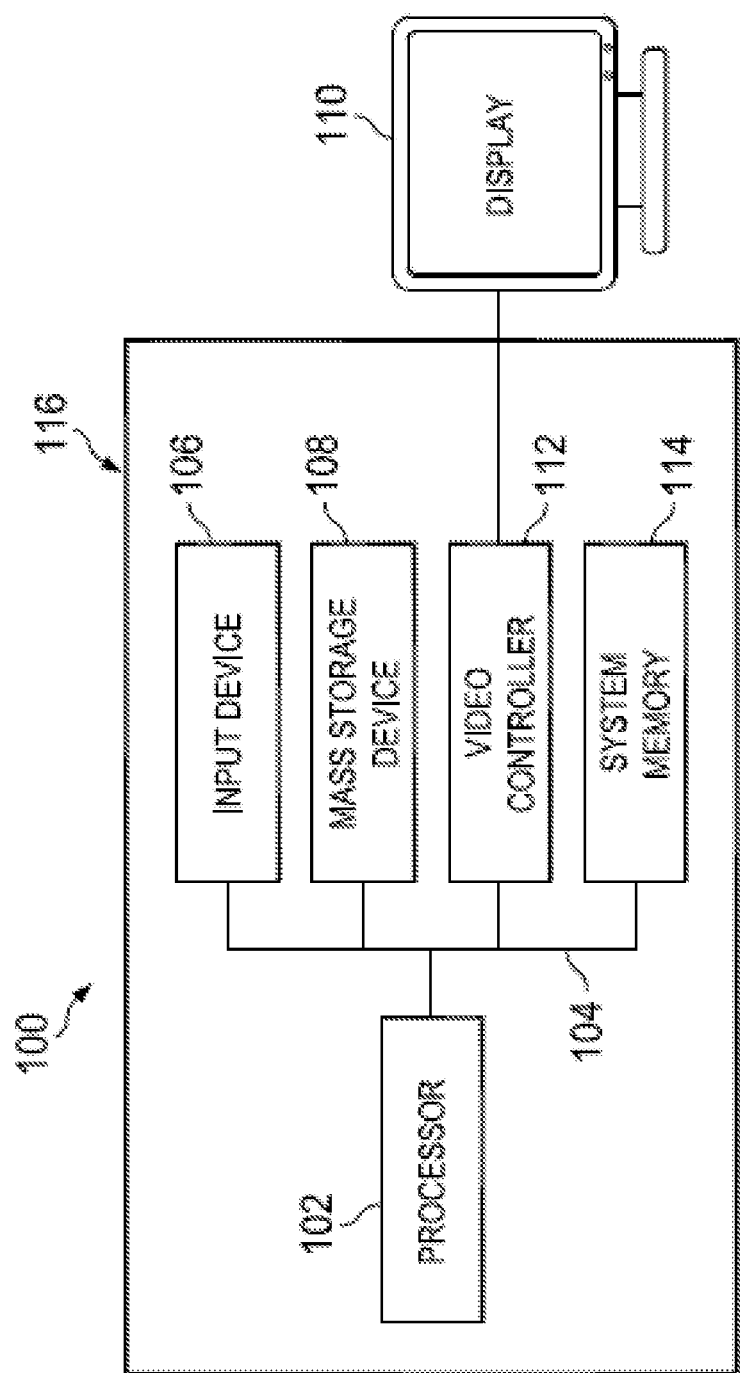
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
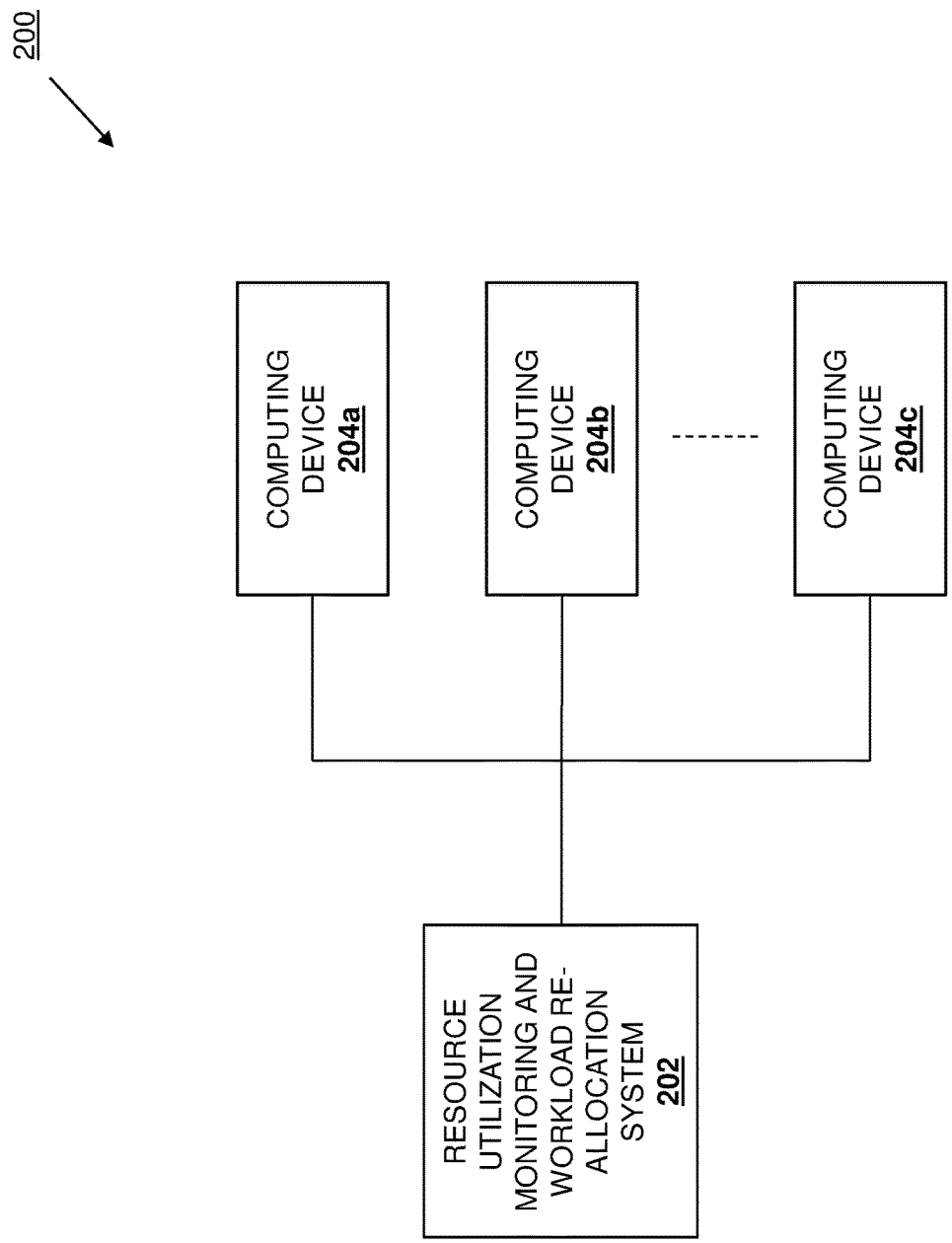
FIG. 2 is a schematic view illustrating an embodiment of a resource-allocation-based workload re-allocation system.

Referring now to FIG. 2, an embodiment of a resource-allocation-based workload re-allocation system 200 is illustrated. In the illustrated embodiment, the resource-allocation-based workload re-allocation system 200 includes a resource utilization monitoring and workload re-allocation system 202. In an embodiment, the resource utilization monitoring and workload re-allocation system 202 may be provided by the IHS 100 discussed above with reference to FIG. 1, and/or may include some or all of the components of the IHS 100. However, while one of skill in the art in possession of the present disclosure will recognize that the resource utilization monitoring and workload re-allocation system 202 is illustrated and discussed as provided by one or more server devices, one of skill in the art in possession of the present disclosure will recognize that resource utilization monitoring and workload re-allocation system 202 provided in the resource-allocation-based workload re-allocation system 200 may include any devices that may be configured to operate similarly as the resource utilization monitoring and workload re-allocation system 202 discussed below.

In the illustrated embodiment, the resource-allocation-based workload re-allocation system 200 also includes a plurality of computing devices 204a, 204b, and up to 204c that are coupled to the resource utilization monitoring and workload re-allocation system 202 directly, via a network (e.g., a Local Area Network (LAN), the Internet, a management network, combinations thereof, and/or via any other networks known in the art), and/or in any other manner that would be apparent to one of skill in the art in possession of the present disclosure. Any or all of the computing devices 204a-204c may be provided by the IHS 100 discussed above with reference to FIG. 1, and/or may include some or all of the components of the IHS 100. In specific examples, any or all of the computing devices 204a-204c may be provided by server devices, desktop computing devices, laptop/notebook computing devices, tablet computing devices, mobile phones, and/or any other computing devices that would be apparent to one of skill in the art in possession of the present disclosure. While a specific resource-allocation-based workload re-allocation system 200 has been illustrated and described, one of skill in the art in possession of the present disclosure will recognize that the resource-allocation-based workload re-allocation system 200 of the present disclosure may include a variety of components and component configurations while remaining within the scope of the present disclosure as well.

Figure 3:
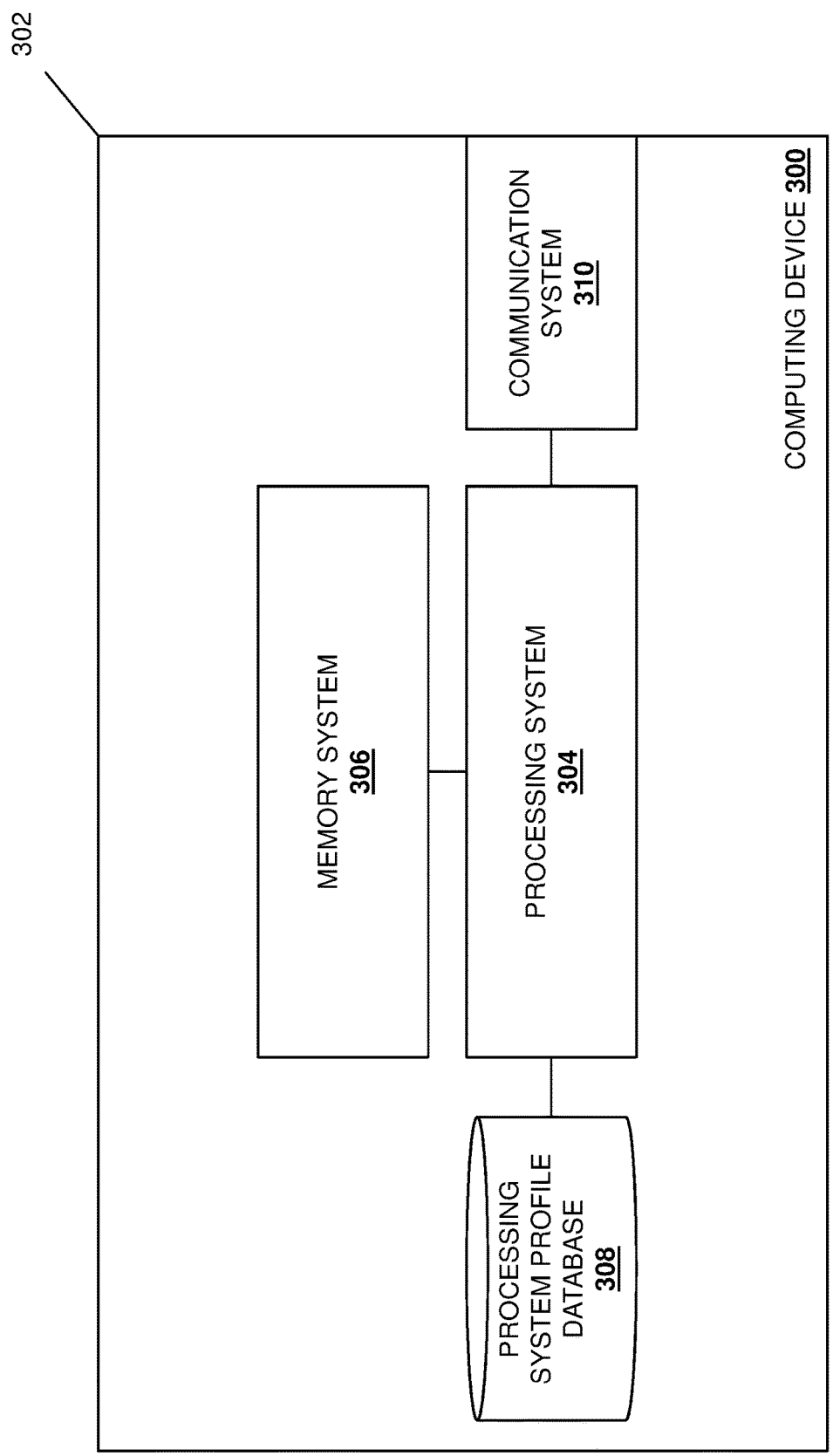
FIG. 3 is a schematic view illustrating an embodiment of a computing device that may be included in the resource-allocation-based workload re-allocation system of FIG. 2.

Referring now to FIG. 3, an embodiment of a computing device 300 is illustrated that may provide any or all of the computing devices 204a-204c discussed above with reference to FIG. 2. As such, the computing device 300 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or any other computing devices that would be apparent to one of skill in the art in possession of the present disclosure. However, one of skill in the art in possession of the present disclosure will recognize that the functionality of the computing device 300 discussed below may be provided by other devices that are configured to operate similarly as discussed below. In the illustrated embodiment, the computing device 300 includes a chassis 302 that houses the components of the computing device 300, only some of which are illustrated below.

In the illustrated embodiment, the chassis 302 houses a processing system 304 that, in the examples described below, is provided by a Graphics Processing Unit (GPU) processing system that includes a plurality of GPU processing subsystems provided by GPUs. However, while discussed as a GPU processing system including multiple GPUs, one of skill in the art in possession of the present disclosure will recognize that the processing system may utilize other processors (e.g., CPUs, etc.) while remaining within the scope of the present disclosure as well. In the illustrated embodiment, the chassis 302 also houses a memory system 306 that, in the examples below, is provided by a Graphics Processing Unit (GPU) memory system that is utilized by the GPU processing system and that includes a plurality of GPU memory subsystems provided by portions of the GPU memory system that are utilized by the respective GPUs in the GPU processing system. However, while discussed as a GPU memory system including multiple GPU memory subsystems, one of skill in the art in possession of the present disclosure will recognize that the memory system may be utilized by other processors (e.g., CPUs, etc.) while remaining within the scope of the present disclosure as well. As will be appreciated by one of skill in the art in possession of the present disclosure, the memory system 306 may be provided with instructions that, when executed by the processing system 304, cause the processing system 304 to perform operations such as the workload operations to provide the workloads discussed below, as well as any other operations described below and/or otherwise known in the art.

The chassis 302 may also house a storage system (not illustrated, but which may include the storage 108 discussed above with reference to FIG. 1) that is coupled to the processing system 304 and that includes a processing system profile database 308 that is configured to store the processing system profiles, scheduling information, and/or any of the other information utilized by the processing system 304 discussed below. The chassis 302 may also house a communication system 310 that is coupled to the processing system 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
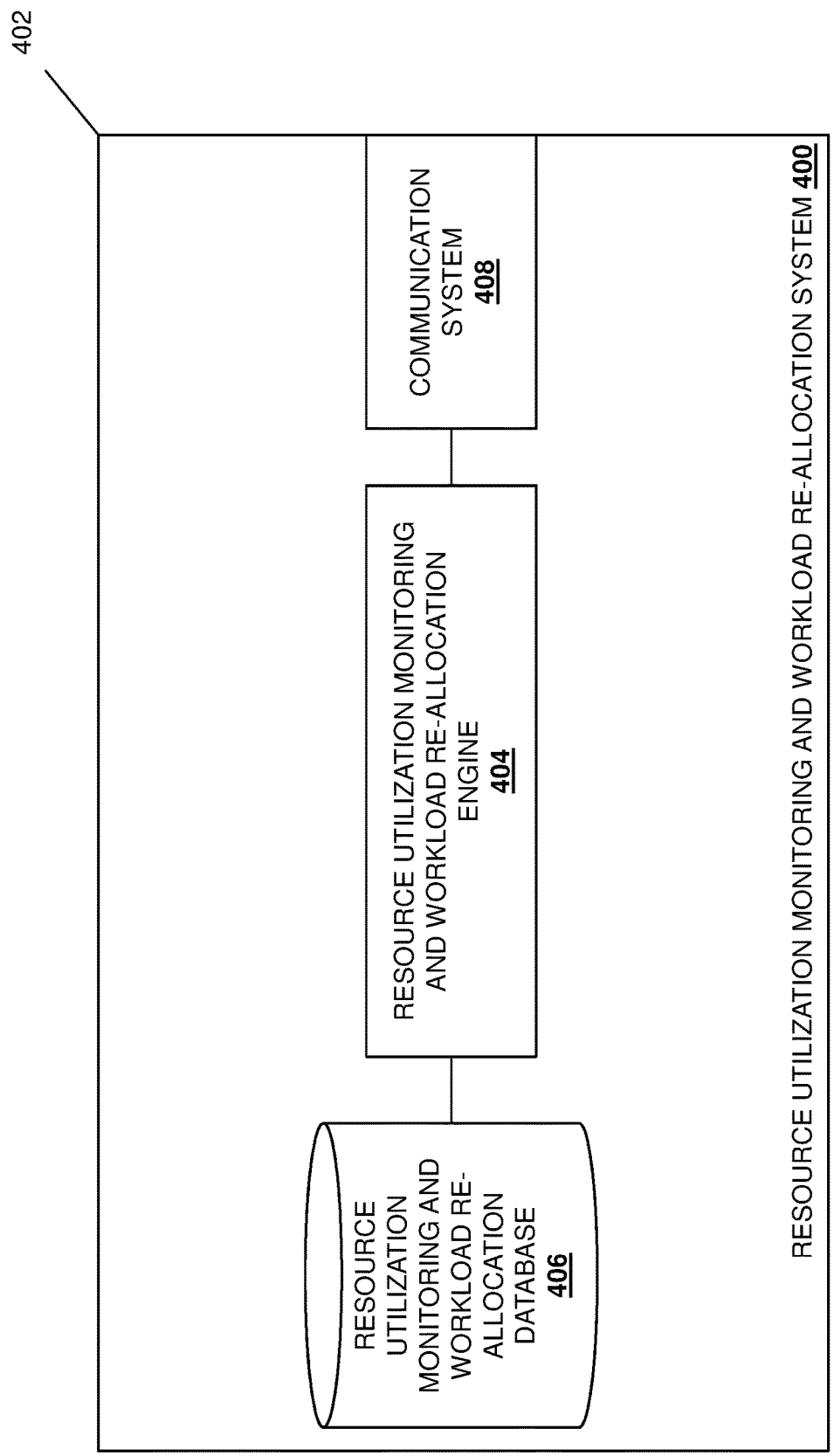
FIG. 4 is a schematic view illustrating an embodiment of a resource utilization monitoring and workload re-allocation system that may be included in the resource-allocation-based workload re-allocation system of FIG. 2.

Referring now to FIG. 4, an embodiment of a resource utilization monitoring and workload re-allocation system 400 is illustrated that may provide the resource utilization monitoring and workload re-allocation system 202 discussed above with reference to FIG. 2. As such, the resource utilization monitoring and workload re-allocation system 400 may be provided by the IHS 100 discussed above with reference to FIG. 1 and/or may include some or all of the components of the IHS 100. Furthermore, while illustrated and discussed as one or more server devices, one of skill in the art in possession of the present disclosure will recognize that the functionality of the resource utilization monitoring and workload re-allocation system 400 discussed below may be provided by other devices that are configured to operate similarly as the resource utilization monitoring and workload re-allocation system 400 discussed below. In the illustrated embodiment, the resource utilization monitoring and workload re-allocation system 400 includes a chassis 402 that houses the components of the resource utilization monitoring and workload re-allocation system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a resource utilization monitoring and workload re-allocation system engine 404 that is configured to perform the functionality of the resource utilization monitoring and workload re-allocation engines and/or resource utilization monitoring and workload re-allocation systems discussed below.

The chassis 402 may also house a storage system (not illustrated, but which may include the storage 108 discussed above with reference to FIG. 1) that is coupled to the resource utilization monitoring and workload re-allocation engine 404 (e.g., via a coupling between the storage system and the processing system) and that includes a resource utilization monitoring and workload re-allocation database 406 that is configured to store any of the information utilized by the resource utilization monitoring and workload re-allocation engine 404 discussed below. The chassis 402 may also house a communication system 408 that is coupled to the resource utilization monitoring and workload re-allocation engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific resource utilization monitoring and workload re-allocation system 400 has been illustrated, one of skill in the art in possession of the present disclosure will recognize that resource utilization monitoring and workload re-allocation systems (or other devices operating according to the teachings of the present disclosure in a manner similar to that described below for the resource utilization monitoring and workload re-allocation system 400) may include a variety of components and/or component configurations for providing conventional resource monitoring and management functionality, as well as the functionality discussed below, while remaining within the scope of the present disclosure as well.

Figure 5:
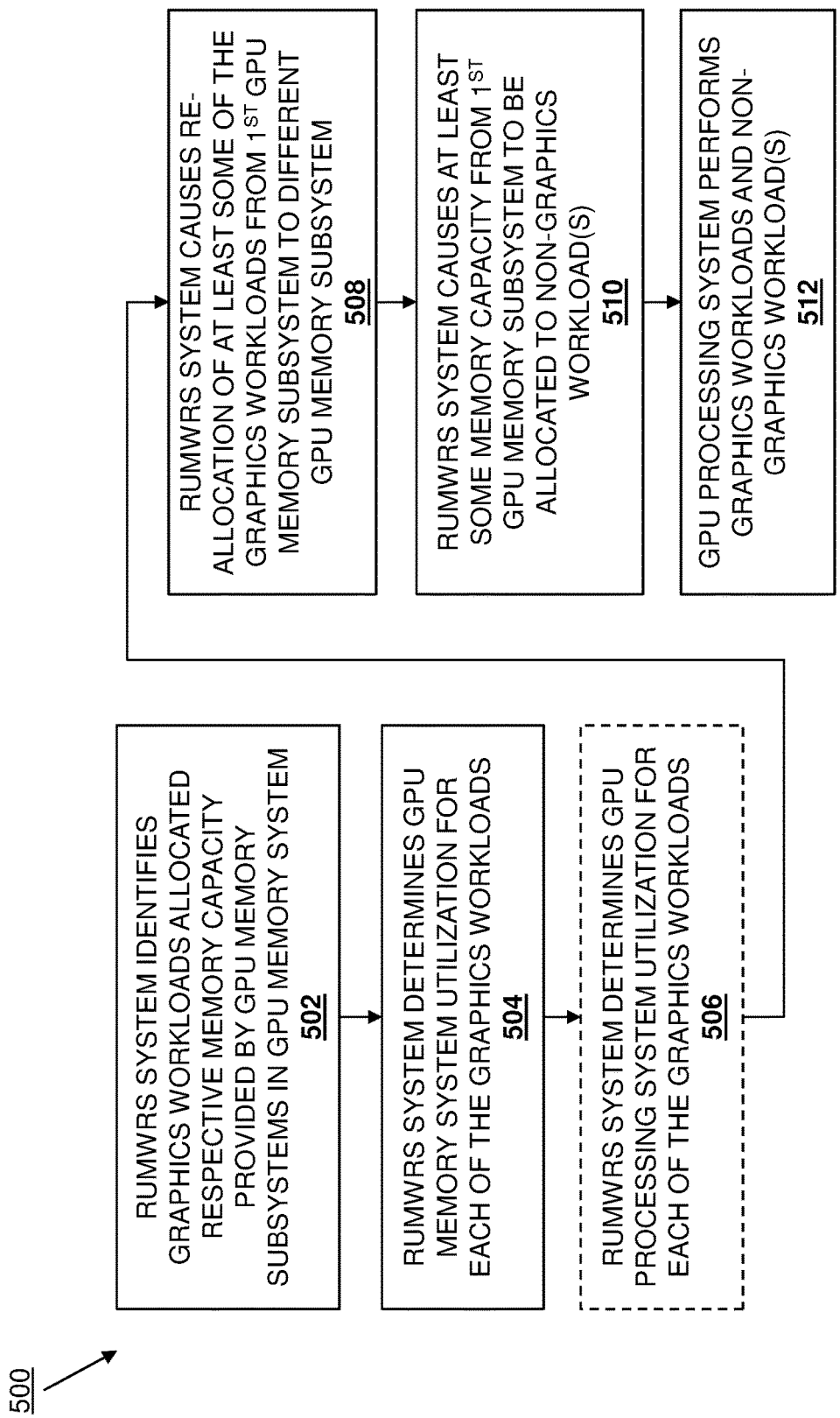
FIG. 5 is a flow chart illustrating an embodiment of a method for re-allocating workloads based on resource utilization.

Referring now to FIG. 5, an embodiment of a method 500 for allocating workloads based on resource utilization is illustrated. As discussed below, embodiments of the systems and methods of the present disclosure provide for the simultaneous usage of processing system resources for graphics and non-graphics workloads, thus providing for more efficient usage of processing system resources. For example, computing devices may include a GPU cards having multiple GPUs and GPU memory, with respective portions of that GPU memory utilized by each GPU. A resource utilization monitoring and workload re-allocation system provided according to the teachings of the present disclosure may identify graphics workloads that are each allocated a respective memory capacity provided in a portion of the GPU memory utilized by one of the GPUs and, for each of those graphics workloads, determine a respective GPU memory utilization of the respective memory capacity allocated to that graphics workload. Based on the respective GPU memory utilization determined for each of the graphics workloads, a re-allocation of at least some of the graphics workloads may be performed from a first portion of the GPU memory utilized by a first GPU to at least one different portion of the GPU memory utilized by a different GPU, and then cause memory capacity provided by the first portion of the GPU memory to be allocated to at least one non-graphics workload. Subsequently, some of GPUs may utilize their respective portions of the GPU memory to perform the graphics workloads, while at least one of the GPUs may utilize its respective portion of the GPU memory to perform the at least one non-graphics workload, allowing for simultaneous performance of the graphics and non-graphics workloads, and a more efficient utilization of the GPUs and GPU memory.

The method 500 begins at block 502 where a resource utilization monitoring and workload re-allocation system identifies graphics workloads that are allocated respective memory capacity provided by GPU memory subsystems in a GPU memory system. In some embodiments, at or prior to block 502, the processing system 304 in the computing device 204a/300 may operate according to processing system profile(s) stored in the processing system profile database 308 that allocate resources in the memory system 306 to graphics workload(s) by, for example, reserving memory capacity in the memory system 306 for user(s)/workloads such that those portions of the memory system 306 are dedicated to those user(s)/workload(s). In the examples below, the processing system 304 is provided by a GPU processing system with multiple GPUs (e.g., four GPUs in the specific example provided below), and the memory system 306 is a GPU memory system with respective portions of its total memory capacity allocated to respective GPUs (e.g., 16 GB of the total 64 GB capacity provided by the GPU memory system dedicated to each GPU).

As such, one specific example of processing system profiles may include GPU profiles for respective first graphics workloads that allocate 1 GB of a particular 16 GB portion of the GPU memory system utilized by a particular GPU to each of those respective first graphics workloads, GPU profiles for respective second graphics workloads that allocate 1 GB of a different 16 GB portion of the GPU memory system utilized by a different GPU to each of those respective second graphics workloads, and so on. Similarly, another specific example of processing system profiles may include GPU profiles for respective third graphics workloads that allocate 512 MB of a particular 16 GB portion of the GPU memory system utilized by a particular GPU to each of those respective third graphics workloads, GPU profiles for respective fourth graphics workloads that allocate 512 MB of a particular 16 GB portion of the GPU memory system utilized by a particular GPU to each of those respective second graphics workloads, and so on. However, while specific examples are provided, one of skill in the art in possession of the present disclosure will recognize that GPU profiles may provide for the allocation of any memory capacity provided by any portion of a GPU memory system utilized by any GPU to any workload while remaining within the scope of the present disclosure as well.

Figure 6A:
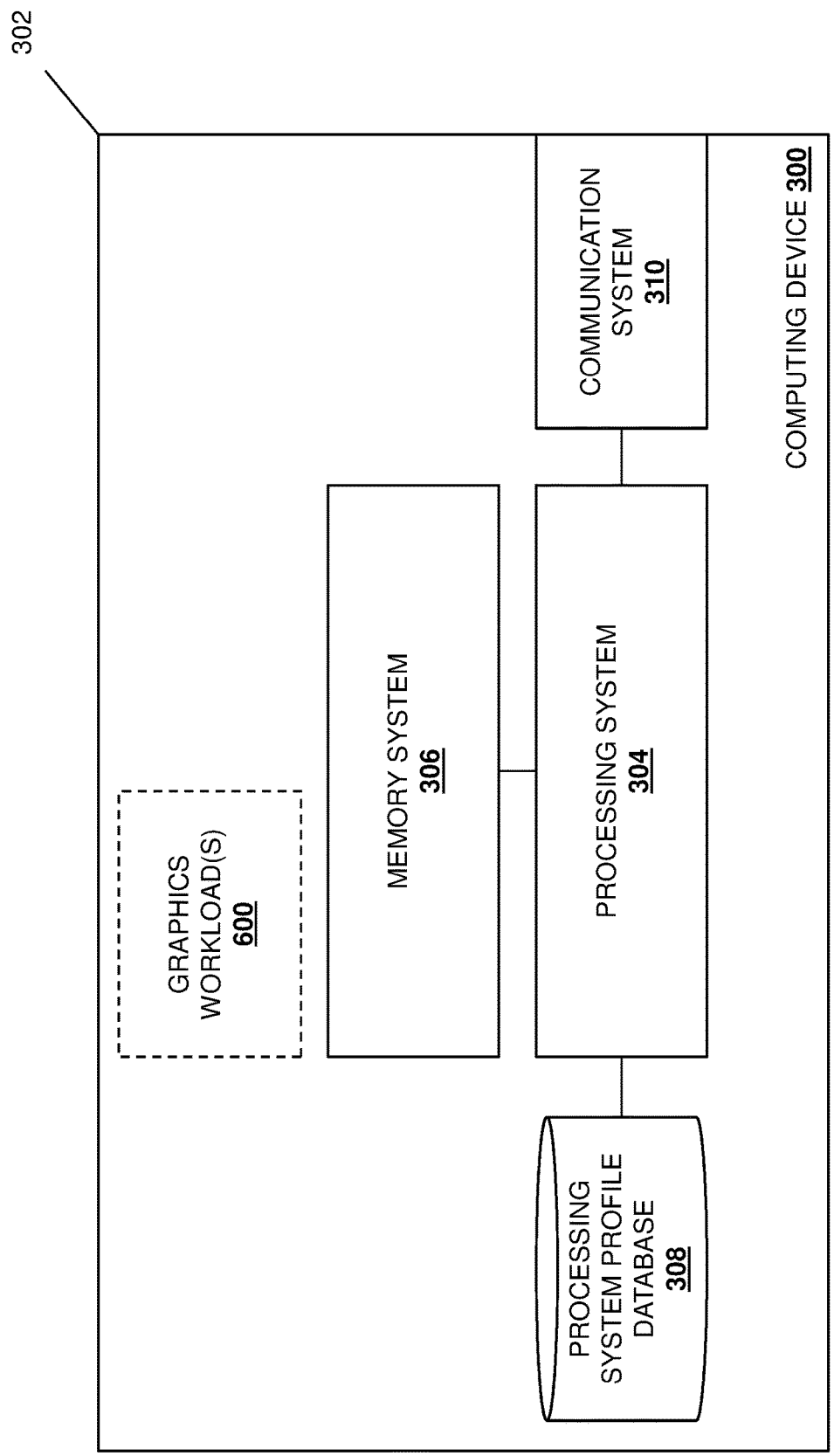
FIG. 6A is a schematic view illustrating an embodiment of the operation of the computing device of FIG. 3 during the method of FIG. 5.

As such, at or before block 502, the processing system 304 may utilize the memory system 306 to perform workloads according to the processing system profile(s) in the processing system profile database 308. For example, FIG. 6A illustrates the computing device 300 with the processing system 304 utilizing the memory system 306 to perform one or more graphics workload(s) 600. Continuing with the example provided above, the embodiment illustrated in FIG. 6A may be provided by a first GPU in the GPU processing system utilizing respective memory capacity in a first GPU memory subsystem (e.g., 1 GB of respective frame buffer resources provided by the first GPU memory subsystem according to a respective processing system profile for each respective graphics workload 600 being provided, 512 MB of respective frame buffer resources provided by the first GPU memory subsystem according to a respective processing system profile for each respective graphics workload 600 being provided, etc.) in the GPU memory system to perform one or more of the graphics workload(s) 600, a second GPU in the GPU processing system utilizing memory capacity in a second GPU memory subsystem (e.g., 1 GB of respective frame buffer resources provided by the second GPU memory subsystem according to a respective processing system profile for each respective graphics workload 600 being provided, 512 MB of respective frame buffer resources provided by the second GPU memory subsystem according to a respective processing system profile for each respective graphics workload 600 being provided, etc.) in the GPU memory system to perform one or more of the graphics workload(s) 600, and so on. Similarly as discussed above, in some embodiments, the performance of graphics workload(s) like those illustrated in FIG. 6A may include providing graphics acceleration for VDI environments, and in conventional systems dedicates the resources of the processing system 304 and memory system 306 for performing those graphics workloads during business hours (i.e., while not performing any non-graphics workloads during those business hours.)

Figure 6B:
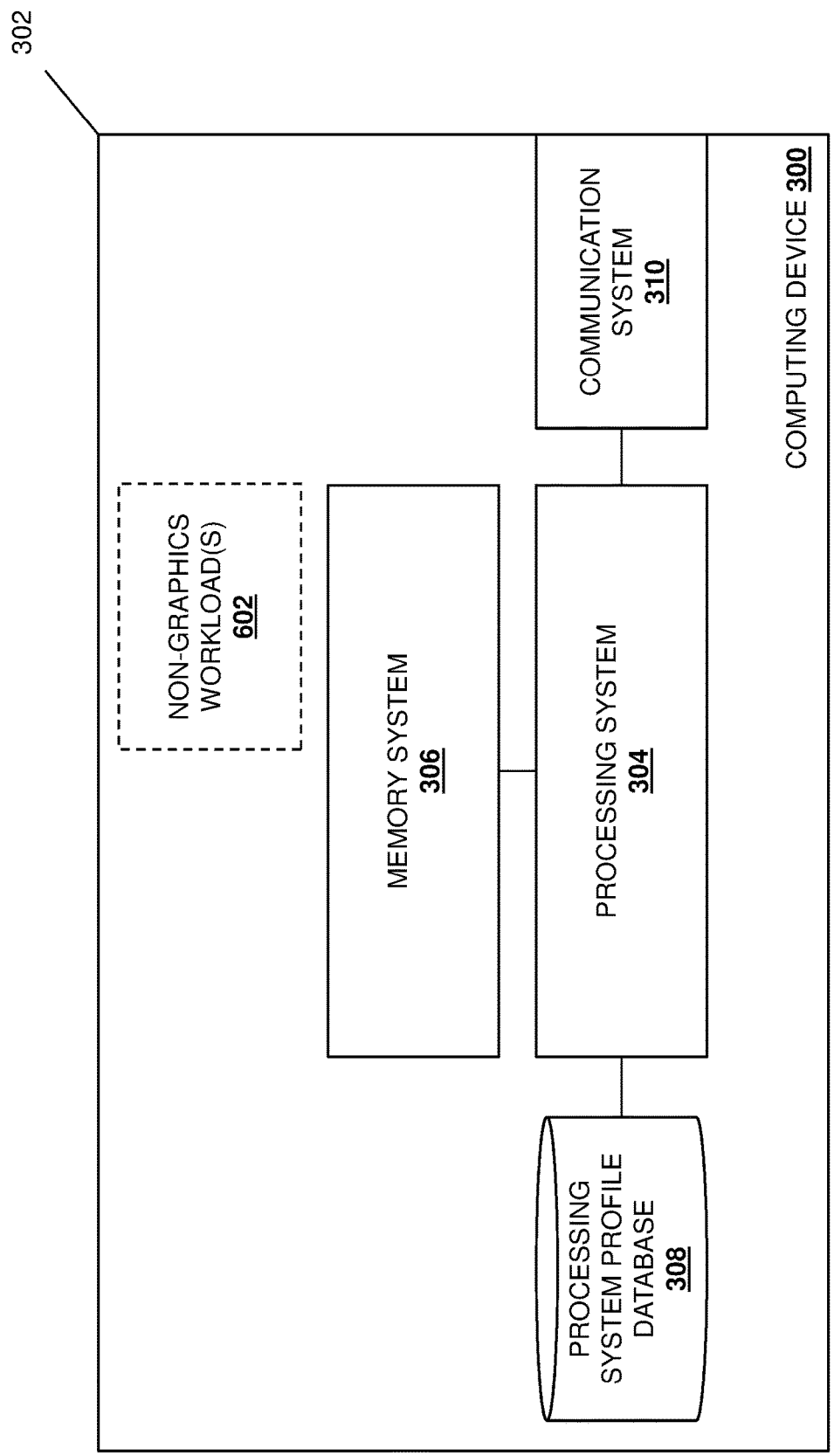
FIG. 6B is a schematic view illustrating an embodiment of the operation of the computing device of FIG. 3 during the method of FIG. 5.

In another example, FIG. 6B illustrates the processing system 304 utilizing the memory system 306 to perform one or more non-graphics workload(s) 602. Continuing with the example provided above, the embodiment illustrated in FIG. 6B may be provided by a first GPU in the GPU processing system utilizing a first GPU memory subsystem in the GPU memory system to perform one or more of the non-graphics workload(s) 602, a second GPU in the GPU processing system utilizing a second GPU memory subsystem in the GPU memory system to perform one or more of the non-graphics workload(s) 602, and so on. Similarly as discussed above, in some embodiments, the performance of non-graphics workload(s) like those illustrated in FIG. 6B may include providing AI operations, ML operations, and DL operations, and in conventional systems dedicates the resources of the processing system 304 and memory system 306 for performing those non-graphics workloads outside of business hours (i.e., while not performing any graphics workloads outside of business hours.) However, while particular conventional workload performance scheduling has been described, one of skill in the art in possession of the present disclosure will recognize that the teachings of the present disclosure will provide benefits over a variety of other conventional workload provisioning scenarios while remaining within the scope of the present disclosure as well.

In some embodiments, the method 500 may begin with a "learning phase" in which learning operations are performed to learn information about the performance of the graphics workload(s) 600 when the non-graphics workload(s) 602 are not being performed and thus not utilizing any resources of the processing system 304 and memory system 306 (e.g., during business hours in the examples provided above.) As such, in an embodiment of block 502, a learning phase of the method 500 may provide for the performance by the processing system 304 (using the memory system 306 as discussed above) of only the graphics workload(s) 600, similarly as illustrated in FIG. 6A. In one example, at block 502, the resource utilization monitoring and workload re-allocation engine 404 in the resource utilization monitoring and workload re-allocation system 400 may operate to identify, via its communication system 408, any graphics workloads being provided in any of the computing devices 204a-204c in the resource-allocation-based workload reallocation system 200 of FIG. 2. As such, with reference to the example illustrated in FIG. 6A, at block 502, the resource utilization monitoring and workload re-allocation engine 404 may identify each of the graphics workload(s) 600 being provided in the computing device 300.

In an embodiment, the identification of the graphics workload(s) 600 at block 502 may include the resource utilization monitoring and workload re-allocation engine 404 in the resource utilization monitoring and workload re-allocation system 400 determining a processing system profile associated with each of those graphics workload(s) 600. In some examples, the resource utilization monitoring and workload re-allocation database 406 in the resource utilization monitoring and workload re-allocation system 400 may include the processing system profiles that are discussed above as being provided to allocate resources in the memory system 306 for use by the processing system 304 in providing each of the graphics workload(s) 600, and at block 502 the resource utilization monitoring and workload re-allocation engine 404 may identify a respective processing system profile for each identified graphics workload 600. However, in other examples, the resource utilization monitoring and workload re-allocation database 406 in the resource utilization monitoring and workload re-allocation system 400 may retrieve the processing system profiles from the processing system profile database 308 in the computing device 300 for each identified graphics workload 600. While a few specific examples are described, one of skill in the art in possession of the present disclosure will recognize that processing system profiles for identified graphics workloads may be obtained by the resource utilization monitoring and workload re-allocation engine 404 in a variety of manners that will fall within the scope of the present disclosure as well. As such, in some embodiments of block 502, the resource utilization monitoring and workload re-allocation engine 404 may identify each graphics workload 600, the memory capacity in a GPU memory subsystem that is allocated to that graphics workload 600, and/or any other graphics workload information that would be apparent to one of skill in the art in possession of the present disclosure.

The method 500 then proceeds to block 504 where the resource utilization monitoring and workload re-allocation system determines a GPU memory system utilization for each of the graphics workloads. In an embodiment, at block 504, the resource utilization monitoring and workload re-allocation engine 404 in the resource utilization monitoring and workload re-allocation system 400 may operate to monitor (e.g., via its communication system 408) a utilization of the GPU memory subsystem provided for each of the graphics workload(s) 600 during a time in which the non-graphics workload(s) 602 are not being performed (e.g., during non-business hours as illustrated in FIG. 6A.) In a specific example, at block 504, the resource utilization monitoring and workload re-allocation engine 404 may utilize any of a variety of GPU resource monitoring tools in order to monitoring an amount of frame buffer resources in the GPU memory system that are being utilized by each of the graphics workload(s) 600 in order to provide graphics acceleration for one or more VDI desktops. However, similarly as discussed above, one of skill in the art in possession of the present disclosure will recognize that graphics workloads may be utilized to provide a variety of graphics operations, and the monitoring of the utilization of GPU memory system resources in providing those graphics operations will fall within the scope of the present disclosure as well. As such, following block 504, the resource utilization monitoring and workload re-allocation engine 404 may have identified an actual GPU memory subsystem resource utilization for each of the graphics workload(s) 600. In the examples provided below, the actual GPU memory subsystem resource utilization is described as a peak utilization, although one of skill in the art in possession of the present disclosure will recognize that other memory utilization measurements will fall within the scope of the present disclosure as well.

The method 500 then proceeds to optional block 506 where the resource utilization monitoring and workload re-allocation system may determine a GPU processing system utilization for each of the graphics workloads. In an embodiment, at optional block 506, the resource utilization monitoring and workload re-allocation engine 404 in the resource utilization monitoring and workload re-allocation system 400 may operate to monitor (e.g., via its communication system 408) a utilization of the GPU provided for each of the graphics workload(s) 600 during a time in which the non-graphics workload(s) 602 are not being performed (e.g., during non-business hours as illustrated in FIG. 6A.) In a specific example, at optional block 506, the resource utilization monitoring and workload re-allocation engine 404 may utilize any of a variety of GPU resource monitoring tools in order to monitoring an amount of processing resources in the GPU performing each of the graphics workload(s) 600 in order to provide graphics acceleration for one or more VDI desktops. However, similarly as discussed above, one of skill in the art in possession of the present disclosure will recognize that graphics workloads may be utilized to provide a variety of graphics operations, and the monitoring of the utilization of GPU resources in providing those graphics operations will fall within the scope of the present disclosure as well. As such, following optional block 506, the resource utilization monitoring and workload re-allocation engine 404 may have identified an actual GPU resource utilization for each of the graphics workload(s) 600. As discussed below, optional block 506 may be optional in that the actual GPU resource utilization for each of the graphics workload(s) 600 may only be utilized by the resource utilization monitoring and workload re-allocation engine 404 in particular situations, discussed in further detail below. In the examples provided below, the actual GPU resource utilization is described as a peak utilization, although one of skill in the art in possession of the present disclosure will recognize that other GPU utilization measurements will fall within the scope of the present disclosure as well.

The method 500 then proceeds to block 508 where the resource utilization monitoring and workload re-allocation system causes re-allocation of at least some of the graphics workloads from a first GPU memory subsystem to a different GPU memory subsystem. In some embodiments of the method 500, the learning phase of the method 500 may completed with a identification of at least some of the graphics workload(s) 600 that can be re-allocated memory capacity in a different GPU memory subsystem such that they are performed by a different GPU. As such, in an embodiment of block 508, the resource utilization monitoring and workload re-allocation engine 404 in the resource utilization monitoring and workload re-allocation system 400 may perform a variety of graphics workload analysis operations at block 508 in order to identify graphics workloads for re-allocation. For example, at block 508 and for each graphics workload 600 identified at block 502, the resource utilization monitoring and workload re-allocation engine 404 may compare the memory capacity in a GPU memory subsystem that is allocated to that graphics workload 600 to the actual GPU memory subsystem resource utilization determined for graphics workload 600 at block 504 in order to identify graphics workloads that are underutilizing their allocated memory capacity in the respective GPU memory subsystem allocated to that graphics workload.

Continuing with the specific example above, at block 508, the resource utilization monitoring and workload re-allocation engine 404 may determine that at least some of the graphics workloads provided by respective GPUs in the GPU processing system are allocated 1 GB of respective frame buffer resources provided by respective GPU memory subsystems according to respective processing system profiles, and that those graphics workloads have an actual GPU memory subsystem resource utilization that is relatively close to that 1 GB of frame buffer resource allocation (e.g., those graphics workloads utilize more than 512 MB of their 1 GB of allocated frame buffer resources in the examples below.) However, at block 508, the resource utilization monitoring and workload re-allocation engine 404 may determine that at least some of the graphics workloads provided by respective GPUs in the GPU processing system are allocated 1 GB of respective frame buffer resources provided by respective GPU memory subsystems according to respective processing system profiles, and that those graphics workloads have an actual GPU memory subsystem resource utilization that is relatively far below that 1 GB of frame buffer resource allocation (e.g., those graphics workloads utilize less than 512 MB of their 1 GB of allocated frame buffer resources.) However, while specific actual GPU memory subsystem resource utilizations and GPU memory subsystem allocation values are provided (e.g., to identify graphics workloads that are allocated 1 GB of GPU memory subsystem resources and using more than 512 MB of GPU memory subsystem resources or less than 512 MB of GPU memory subsystem resources), one of skill in the art in possession of the present disclosure will recognize that different actual GPU memory subsystem resource utilizations and GPU memory subsystem allocation values will fall within the scope of the present disclosure as well.

In some embodiments, the resource utilization monitoring and workload re-allocation engine 404 may then generate a re-allocation list (e.g., in the resource utilization monitoring and workload re-allocation database 406) of graphics workload(s) 600 that are underutilizing their allocated memory capacity provided in their allocated GPU memory subsystem. Continuing with the specific example discussed above, the re-allocation list generated by the resource utilization monitoring and workload re-allocation engine 404 may identify each of the graphics workloads that utilize less than 512 MB of their 1 GB of allocated frame buffer resources. Furthermore, in some embodiments, the resource utilization monitoring and workload re-allocation engine 404 may rank the re-allocation list of graphics workload(s) 600 that are underutilizing their allocated memory capacity provided in their GPU memory subsystem by the GPU processing system utilization determined for those graphics workloads at optional block 506. As such, continuing with the specific example discussed above, the re-allocation list generated by the resource utilization monitoring and workload re-allocation engine 404 may identify each of the graphics workloads that utilize less than 512 MB of their 1 GB of allocated frame buffer resources, with graphics workloads having lower GPU processing system utilization prioritized in the re-allocation list (e.g., prioritized for re-allocation as discussed below) over graphics workloads having higher GPU processing system utilization. As such, following the learning phase of the method 500, a re-allocation list of graphics workloads may be generated that identifies graphics workloads that are candidates for re-allocation to different GPU memory subsystems, and those identified graphics workloads may be prioritized by lowest GPU processing system utilization, which as discussed below, may allow for the re-allocation of graphics workloads in a manner that provides for "tightly packed" GPU/GPU memory subsystem/graphics workload combinations that are less likely to require more GPU resources than are available via that GPU.

In an embodiment, following the learning phase of the method 500, a re-allocation phase of the method 500 may begin in which graphics workloads are re-allocated to different GPU memory subsystem(s). In the examples described below, the re-allocation phase provides for the re-allocation of all of the graphics workloads allocated memory capacity on a GPU memory subsystem utilized by a GPU in order to entirely free that GPU/GPU memory subsystem up (i.e., by ensuring that no graphics workloads are allocated memory capacity provided by the GPU memory subsystem utilized by that GPU.) However, one of skill in the art in possession of the present disclosure will recognize that other re-allocations may fall within the scope of the present disclosure as well. As such, at block 508, the resource utilization monitoring and workload re-allocation engine 404 may operate to cause a re-allocation of at least some of the graphics workload(s) 600 that are allocated memory capacity on a first GPU memory system to a different GPU memory system.

In an embodiment, at block 508, the resource utilization monitoring and workload re-allocation engine 404 in the resource utilization monitoring and workload re-allocation system 400 may utilize the re-allocation list in order to cause at least some of the graphics workload(s) 600 that were allocated memory capacity provide by a first GPU memory subsystem to be reallocated memory capacity provided by a different GPU subsystem. Continuing with the example provided above in which the processing system 304 includes four GPUs, each of which is allocated a 16 GB GPU memory subsystem of the 64 GB capacity GPU memory system 306, 64 graphics workloads may have been identified as each being allocated 1 GB of memory capacity in the GPU memory system 306 (i.e., each 16 GB GPU memory subsystem allocated to one of the GPUs may provide for the performance of 16 graphics workloads.) Furthermore, at block 504 of the method 500, the resource utilization monitoring and workload re-allocation engine 404 may determine that 24 of those graphics workloads have a peak GPU memory subsystem resource utilization of over 512 MB of their 1 GB of allocated memory capacity, while 40 of those graphics workloads have a peak GPU memory subsystem resource utilization of under 512 MB of their 1 GB of allocated memory capacity. Further still, at block 506 of the method 500, the resource utilization monitoring and workload re-allocation engine 404 may determine the GPU processing system utilization of the 40 graphics workloads that have a peak GPU memory subsystem resource utilization of under 512 MB of their 1 GB of allocated memory capacity.

As such, in this specific example, the resource utilization monitoring and workload re-allocation engine 404 may use the GPU processing system utilization determined for the 40 graphics workloads that have a peak GPU memory subsystem resource utilization of under 512 MB of their 1 GB of allocated memory capacity in order to identify 32 of those graphics workloads with the lowest GPU processing system utilization (i.e., GPU processing system utilizations that are each lower than the remaining 8 of those graphics workloads), and may operate to re-allocate those 32 graphics workloads. As discussed above, the 32 graphics workloads selected for re-allocation each have a peak GPU memory subsystem resource utilization of under 512 MB of their 1 GB of allocated memory capacity, which allows the processing system profiles that provide for the performance of those graphics workloads to be modified such that each of those 32 graphics workloads are re-allocated 512 MB of a GPU memory subsystem in the GPU memory system (i.e., rather than the 1 GB they are currently allocated of their respective GPU memory subsystem in the GPU memory system).

Thus, in one embodiment of block 508, the resource utilization monitoring and workload re-allocation engine 404 may cause the processing system profiles for the 32 graphics workloads identified for re-allocation to be modified by, for example, providing an instruction to the computing device 300 which provides those graphics workloads (e.g., via its GPU processing system and GPU memory system) to modify those processing system profiles to adjust the memory capacity of the GPU memory subsystems allocated to those graphics workloads, which may cause that computing device 300 to modify the processing system profiles for those graphics workloads. In another embodiment of block 508, the resource utilization monitoring and workload re-allocation engine 404 may generate modified processing system profiles for the 32 graphics workloads identified for re-allocation, and transmit those modified processing system profiles to the computing device 300 which provides those graphics workloads (e.g., via its GPU processing system and GPU memory system) in order to provide for the adjustment of the memory capacity of the GPU memory subsystems allocated to those graphics workloads. While a few examples have been provided, one of skill in the art in possession of the present disclosure will recognize that the processing system profiles discussed above may be modified in a variety of manners that will fall within the scope of the present disclosure as well.

As discussed above, in some examples of block 508, the resource utilization monitoring and workload re-allocation engine 404 may operate to re-allocate each of the graphics workloads performed by a particular GPU in the GPU processing system in order to "free up" or otherwise make available that GPU for the performance of only non-graphics workloads. As such, at block 508 and in addition to and/or as part of the modification of the processing system profiles discussed above, the resource utilization monitoring and workload re-allocation engine 404 may provide for the "movement" of one or more of the graphics workloads 600 such that they are performed by different GPUs in the GPU processing system such that at least one of the GPUs in the GPU processing system is available for the performance of only non-graphics workloads. As such, continuing with the example provided above, processing system profiles for graphics workloads that have a peak GPU memory subsystem resource utilization of under 512 MB of their 1 GB of allocated memory capacity and, in some situations, graphics workloads that have a peak GPU memory subsystem resource utilization of under 512 MB of their 1 GB of allocated memory capacity and a relatively low GPU processing system utilization, may have their associated processing system profiles modified such that they will be subsequently performed by different GPUs. However, while the "movement" of graphics workloads in order to free up a GPU has been described as being accomplished via modifications to the processing system profiles associated with those graphics workloads, one of skill in the art in possession of the present disclosure will recognize that separate operations (e.g., by the resource utilization monitoring and workload re-allocation engine 404 and/or the computing device 300 performing those graphics workloads) and/or processing system profile modifications/separate operation combinations may be performed to enable such movement while remaining within the scope of the present disclosure as well.

As such, one of skill in the art in possession of the present disclosure will recognize how, at block 508, information (e.g., scheduling information) associated with any or all of the graphics workloads 600 may be modified such that a different GPU will provide for the performance of that graphics workload in a manner that results in at least one of the GPUs no longer being allocated for the performance of any graphics workloads. One of skill in the art in possession of the present disclosure will recognize how graphics workloads may be scheduled to be performed by any desired GPU using a variety of different techniques that will fall within the scope of the present disclosure, and thus those techniques are not described herein in detail. Continuing with the example provided above, the resource utilization monitoring and workload re-allocation engine 404 may provide for the performance of each of the 32 graphics workloads that were re-allocated 512 MB of memory capacity on the same GPU memory subsystem in the GPU memory system (such that those 32 graphics workloads utilize the entire 16 GB capacity of that GPU memory subsystem), which provides for the performance of those 32 graphics workloads by a single GPU that utilizes that GPU memory subsystem. As will be appreciated by one of skill in the art in possession of the present disclosure, the remaining 32 graphics workloads that are each still allocated 1 GB of memory capacity each may then be provided on two 16 GB GPU memory subsystems in the GPU memory system (e.g., with some combination of a first set of 16 of those graphics workloads utilizing the entire 16 GB capacity of one of those GPU memory subsystems, and some combination of a second set of 16 of those graphics workloads utilizing the entire 16 GB capacity of the other of those GPU memory subsystems) such that a respective GPU utilizes each of those GPU memory subsystems to provide for the performance of those 32 graphics workloads. Thus, following the re-allocation discussed above, one of the four GPUs available in the GPU processing system may be freed up and/or otherwise not associated with the performance of any of the graphics workloads 600.

The example above includes a re-allocation of 32 graphics workloads with relatively low GPU memory system utilization such that they may be performed by a single GPU, and that re-allocation may be performed in a manner that requires re-allocation of at least some of the remaining 32 graphics workloads with relatively high GPU memory utilization and/or relatively high GPU processing system utilization such that those graphics workloads may be performed by different GPUs in order to free up at least one GPU for the performance of non-graphics workloads. As would be recognized by one of skill in the art in possession of the present disclosure, in some situations the re-allocation of graphics workloads with relatively high GPU memory utilization and/or relatively high GPU processing system utilization may not be necessary (i.e., the re-allocation of graphics workloads with relatively low GPU memory utilization may, by itself, free up one or more GPUs.) Furthermore, one of skill in the art in possession of the present disclosure will recognize that the "tight packing" of graphics workloads with a GPU memory subsystem/GPU combination discussed above (e.g., the provisioning of the 32 graphics workloads that were re-allocated 512 MB of memory capacity on a single GPU memory subsystem utilized by a single GPU such that the entire 16 GB capacity of that GPU memory subsystem is allocated to graphics workloads) may benefit from the graphics workload/GPU processing system utilization determinations, as providing for the tight packing of the graphics workloads with the lowest GPU processing system utilizations makes it more likely that such tight packing will not exceed the capabilities of the GPU performing those graphics workloads in a manner that might cause any of those graphics workloads to experience degraded performance. However, one of skill in the art in possession of the present disclosure will recognize that relatively high performance GPUs may not require such graphics workload/GPU processing system utilization determinations, and/or such graphics workload/GPU processing system utilization determinations may be unnecessary if the number of graphics workloads that are candidates for re-allocation (e.g., by having relatively low GPU memory system utilization) does not produce such tight packing opportunities.

As will be appreciated by one of skill in the art in possession of the present disclosure, the freeing up of at least one GPU for the performance of non-graphics workloads may be beneficial in situations in which it is particular desirable to ensure that graphics workloads do not experience degradation due to, for example, the sharing of GPU resources with non-graphics workloads in a manner that can result in degraded performance of those graphics workloads (i.e., due to the relatively high utilization of those GPU resources by the non-graphics workloads). For example, it may be desirable to ensure that a VDI desktop, provided via the graphics acceleration performed by a GPU, is not degraded by that GPU performing AI operations/ML operations/DL operations, and thus the segregation GPUs that perform graphics workloads (such as graphics acceleration for VDI desktops) from GPUs that perform AI operations/ML operations/DL operations may be desirable. However, one of skill in the art in possession of the present disclosure will recognize that combining the performance of graphics workloads and non-graphics workloads by a single GPU may be permissible in some situations (including the combined provisioning of VDI desktops and AI operations/ML operations/DL operations) while remaining within the scope of the present disclosure as well. As such, the freeing up of one or more GPUs for the performance of only non-graphics workloads discussed above may be optional in some embodiments of the present disclosure, and one of skill in the art in possession of the present disclosure will recognize how the operations discussed above may be modified/simplified when such segregation requirements are not required.

One of skill in the art in possession of the present disclosure will recognize that the operations discussed above as being performed at block 508 have been described with greatly simplified examples in order to illustrate how re-allocation of graphics workloads can be performed, and that actual graphics workload re-allocation may be much more complicated by including a variety of different memory capacity re-allocations, GPU re-allocations/scheduling, and/or any other re-allocation characteristics that would be apparent to one of skill in the art in possession of the present disclosure. For example, the re-allocation of graphics workloads described above may be performed between GPU cards, across computing devices, and/or in any other manner that would be apparent to one of skill in the art in possession of the present disclosure. Furthermore, first graphics workloads may be re-allocated from being performed by a first GPU/GPU memory system to being performed by a different GPU/GPU memory system in order to free up resources/capacity in that first GPU/GPU memory system, which allows second graphics workloads to be re-allocated from being performed by a second GPU/GPU memory system to being performed by the first GPU/GPU memory system (which was freed up resources/capacity to perform those second graphics workloads) while freeing up the second GPU/GPU memory system from performing any graphics workloads (so that the second GPU/GPU memory system may perform non-graphics workloads as discussed below). As such, the examples provided above are simply provided in order to illustrate basic concepts of the present disclosure with regard to graphics workload re-allocation, and one of skill in the art in possession of the present disclosure will recognize how those basic concepts may be extended to handle much more complicated and detailed situations.

While one of skill in the art in possession of the present disclosure will recognize that blocks 504, 506, and 508 of the method 500 may be performed in a variety of manners that will fall within the scope of the present disclosure, the pseudo-code provided below illustrates a specific example of an implementation of the resource utilization monitoring and workload re-allocation engine 404:

```
DEFINE ARRAY VGPU_LIST
DEFINE LEARN-PHASE-DURATION
DEFINE VALID-PROFILES
WHILE (TIME-ELAPSED < LEARN-PHASE-DURATION)
{
FOR EACH (VGPU IN VGPU_LIST)
    {
    MEMORY_LOOKUP_TABLE_STORE (CURRENT-MEMORY-UTLIIZATION);
    GPU_LOOKUP_TABLE_STORE (CURRENT-GPU-PROCESSOR-UTILIZATION);
    }
}
IF (TIME-ELAPSED == LEARN-PHASE-DURATION)
{
    MEMORY_LOOKUP_TABLE = SORT (MEMORY_LOOKUP_TABLE);
    GPU_LOOKUP_TABLE - SORT (GPU_LOOKUP-TABLE);
    FOR EACH (BGPU IN MEMORY_LOOKUP_TABLE)
    {
        IF (PEAK-MEMORY-UTILIZATION < NEXT-LOWEST-VALID-PROFILE)
            CANDIDATE-FOR-REPROFILING = TRUE
            INCREMENT CANDIDATE-FOR-REPROFILING-COUNT
        }
```

```
        IF (Physical GPU will be freed up by re-profiling)
        {
                Reprofile GPUs based on "CANDIDATE-FOR-REPROFILING = TRUE"
                and in ascending order of GPU processor utilization
                }
        }
}
```

The method 500 then proceeds to block 510 where the resource utilization monitoring and workload re-allocation system causes at least some memory capacity from the first GPU memory to be allocated to at least one non-graphics workload. In an embodiment, at block 510, the resource utilization monitoring and workload re-allocation engine 404 in the resource utilization monitoring and workload re-allocation system 400 may provide and/or modify information (e.g., scheduling information) associated with any or all of the non-graphics workloads 602 that provides for the performance of that non-graphics workload by one of the GPUs that had its previously performed graphics workloads re-allocated for performance by a different GPU. Continuing with the examples above, at block 510, one or more of the non-graphics workloads 602 may be scheduled for performance by the GPU (which was freed up at block 508) via its GPU memory subsystem. For example, a number of non-graphics workloads may be scheduled for performance by the GPU (which was freed up at block 508) via its GPU memory subsystem up to a GPU processing resource capability of that GPU. However, while discussed as being provided on a freed up GPU, as discussed above, in some situations GPUs and their GPU memory subsystems may be allocated for the performance of both graphics workloads and non-graphics workloads at the same time while remaining within the scope of the present disclosure.

Figure 6C:
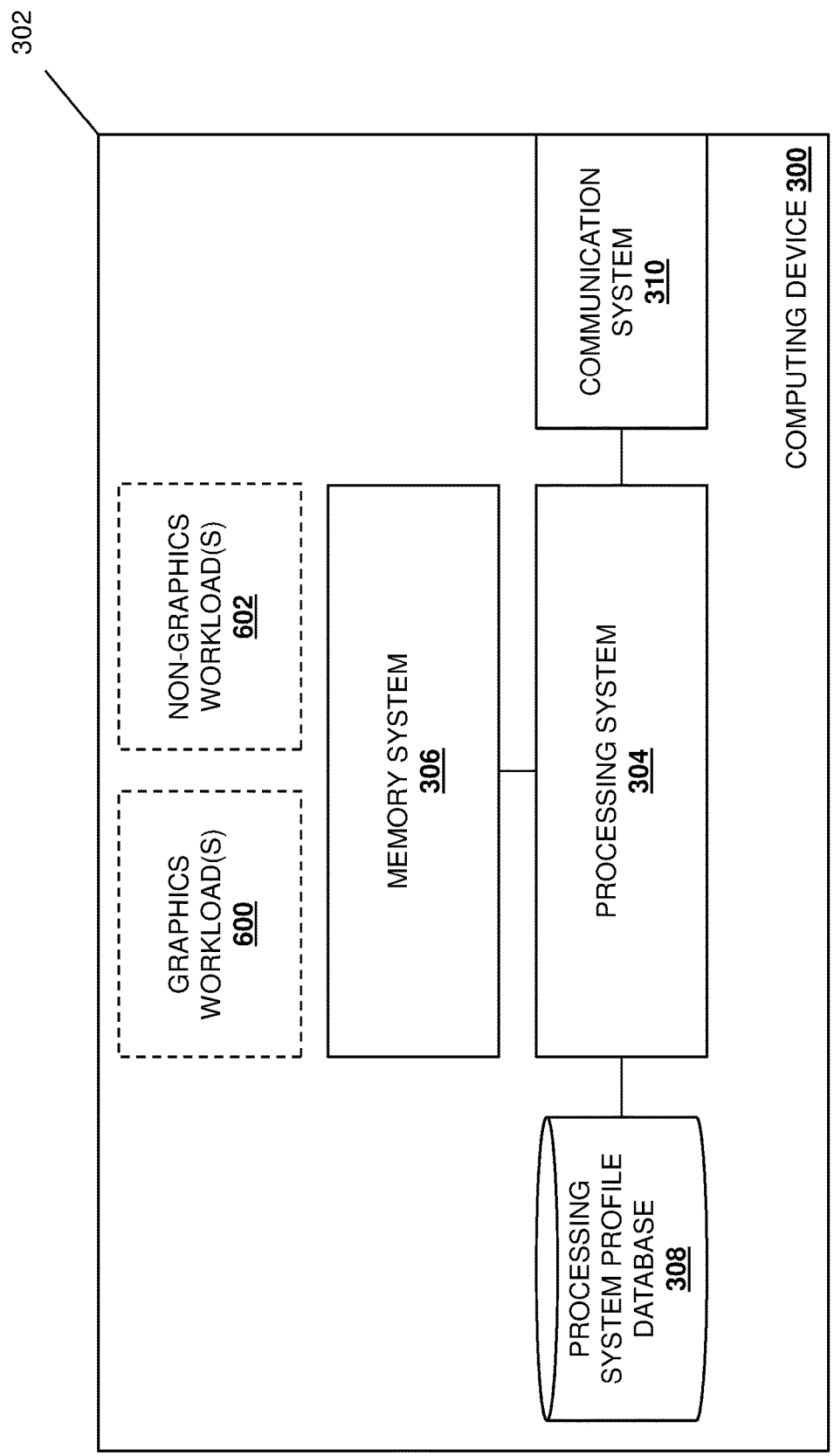
FIG. 6C is a schematic view illustrating an embodiment of the operation of the computing device of FIG. 3 during the method of FIG. 5.

The method 500 then proceeds to block 512 where a GPU processing system performs the graphics workloads and non-graphics workloads. In an embodiment, following the re-allocation phase of the method 500, the method 500 may begin a production phase in which graphics workloads and non-graphics workloads are performed, while the system attempts to identify opportunities for further re-allocation of graphics workloads and non-graphics workloads. For example, at block 512 and as illustrated in FIG. 6C, the GPUs in the GPU processing system may utilize their respective GPU memory subsystem in the GPU memory system in order to perform the graphics workload(s) 600 and the non-graphics workload(s) 602 according to their respective processing system profiles and/or scheduling information stored in the processing system profile database 308. As such, in some examples, at block 512, graphics workloads 600 and non-graphics workloads may be performed simultaneously (e.g., during business hours) by the GPUs in the GPU processing system using their respective GPU memory subsystems in the GPU memory system. Thus, continuing with the example provided above, three GPUs in the GPU processing system may perform the graphics workloads 600 during business hours via their respective GPU memory subsystems in the GPU memory system, while the remaining GPU in the GPU processing system may perform the one or more non-graphics workload(s) 602 during business hours via its respective GPU memory subsystem in the GPU memory system. However, as discussed above, the performance of graphics workloads and non-graphics workloads by the same GPU via its GPU memory subsystem may fall within the scope of the present disclosure as well.

Furthermore, the resource utilization monitoring and workload re-allocation engine 404 in the resource utilization monitoring and workload re-allocation system 400 may continue to perform blocks 502, 504, 506, 508, and/or 512 of the method 500 in order to continue to identify graphics workloads being performed, determining their GPU memory system utilization and (in some situations) their GPU processing system utilization, re-allocate graphics workloads from particular GPU/GPU memory subsystems, cause non-graphics workloads to be allocated to those particular GPU/GPU memory subsystems, and perform the graphics workloads and non-graphics workloads. Further still, the determinations of GPU memory system utilization and (in some situations) GPU processing system utilization may allow the re-allocation of additional memory capacity provided by GPU memory subsystem to a graphics workload (e.g., if it is determined that graphics workload is using its entire allocated memory capacity/more than its allocated memory capacity.) As such, the resource-allocation-based workload re-allocation system 200 may continually attempt to modify the performance of graphics workloads and non-graphics workloads by the GPU processing system/GPU memory system to ensure efficient performance of both.

Thus, systems and methods have been described that provide for the simultaneous usage of processing system resources for different types of workloads, thus providing for more efficient usage of processing system resources. For example, computing devices may include a processing system with multiple processors and a memory system, with respective portions of that memory system utilized by each processor. A resource utilization monitoring and workload re-allocation system provided according to the teachings of the present disclosure may identify first workloads that are each allocated a respective memory capacity provided in a portion of the memory system utilized by one of the processors and, for each of those first workloads, determine a respective memory system utilization of the respective memory capacity allocated to that first workload. Based on the respective memory subsystem utilization determined for each of the first workloads, a re-allocation of at least some of the first workloads may be performed from a first portion of the memory system utilized by a first processor to at least one different portion of the memory system utilized by a different processor, and then cause memory capacity provided by the first portion of the memory system to be allocated to at least one second workload. Subsequently, some of processors may utilize their respective portions of the memory system to perform the first workloads, while at least one of the processors may utilize its respective portion of the memory system to perform the at least one second workload, allowing for simultaneous performance of the first and second workloads and more efficient utilization of the processors and memory system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resource-allocation-based workload re-allocation system, comprising: a computing device including:
   a Graphics Processing Unit (GPU) processing system including a plurality of GPU processing subsystems; and
   a GPU memory system including a respective GPU memory subsystem utilized by each of the plurality of GPU processing subsystems; and
   a resource utilization monitoring and workload re-allocation system that is coupled to the computing device and that is configured to:
      identify a plurality of graphics workloads that are each allocated a respective memory capacity provided by one of the GPU memory subsystems included in the GPU memory system;
      determine, for each of the plurality of graphics workloads, a respective GPU memory subsystem utilization of the respective memory capacity allocated to that graphics workload;
      cause, based on the respective GPU memory subsystem utilization determined for each of the plurality of graphics workloads, a re-allocation of at least some of the plurality of graphics workloads from a first GPU memory subsystem included in the GPU memory system to at least one different GPU memory subsystem included in the GPU memory system; and
      cause memory capacity provided by the first GPU memory subsystem to be allocated to at least one non-graphics workload.

2. The system of claim 1, wherein the causing the re-allocation of the at least some of the plurality of graphics workloads from the first GPU memory subsystem to the at least one different GPU memory subsystem includes:
   causing the reallocation of all of the graphics workloads that are allocated a respective memory capacity provided by the first GPU memory subsystem such that all of those graphics workloads are re-allocated to the at least one different GPU memory subsystem.

3. The system of claim 1, wherein the computing device is configured to:
   determine, for each of the plurality of graphics workloads, a respective GPU processing subsystem utilization of the GPU processing subsystem that utilizes the GPU memory subsystem that includes the respective memory capacity allocated to that graphics workload, wherein the at least some of the plurality of graphics workloads that are re-allocated from the first GPU memory subsystem to the at least one different GPU memory subsystem include a first subset of the plurality of graphics workloads that have each have a lower respective GPU processing subsystem utilization relative to a second subset of the plurality workloads.

4. The system of claim 1, wherein the computing device is configured to:
   cause, based on the respective GPU memory subsystem utilization determined for each of the plurality of graphics workloads, a reduction of the amount of the respective memory capacity allocated to the at least some of the plurality of graphics workloads.

5. The system of claim 1, wherein the at least one non-graphics workload includes at least one of an Artificial Intelligence (AI) workload, a Machine Learning (ML) workload, and a Deep Learning (DL) workload.

6. The system of claim 1, wherein the respective memory capacity allocated to each of the plurality of graphics workloads includes a frame buffer capacity, and wherein the respective GPU memory subsystem utilization determined for each of the plurality of graphics workloads includes a frame buffer utilization.

7. The system of claim 1, wherein the GPU processing system in the computing device is configured to perform the plurality of graphics workloads and the at least one non-graphics workload at the same time.

8. The IHS of claim 7, wherein the resource utilization monitoring and workload re-allocation engine is configured to:
   determine, for each of the plurality of graphics workloads, a respective GPU processing subsystem utilization of a GPU processing subsystem that utilizes the GPU memory subsystem that includes the respective memory capacity allocated to that graphics workload, wherein the at least some of the plurality of graphics workloads that are re-allocated from the first GPU memory subsystem to the at least one different GPU memory subsystem include a first subset of the plurality of graphics workloads that have each have a lower respective GPU processing subsystem utilization relative to a second subset of the plurality workloads.

9. The IHS of claim 7, wherein the resource utilization monitoring and workload re-allocation engine is configured to:
   cause, based on the respective GPU memory subsystem utilization determined for each of the plurality of graphics workloads, a reduction of the amount of the respective memory capacity allocated to the at least some of the plurality of graphics workloads.

10. An Information Handling System (IHS), comprising:
   a processing system; and
   a memory system that is coupled to the processing system and that includes instructions that, when executed by the processing system, cause the processing system to provide a resource utilization monitoring and workload re-allocation engine that is configured to:
      identify a plurality of graphics workloads that are each allocated a respective memory capacity provided by one of a plurality of Graphics Processing Unit (GPU) memory subsystems included in a GPU memory system;
      determine, for each of the plurality of graphics workloads, a respective GPU memory subsystem utilization of the respective memory capacity allocated to that graphics workload;
      cause, based on the respective GPU memory subsystem utilization determined for each of the plurality of graphics workloads, a re-allocation of at least some of the plurality of graphics workloads from a first GPU memory subsystem included in the GPU memory system to at least one different GPU memory subsystem included in the GPU memory system; and
      cause memory capacity provided by the first GPU memory subsystem to be allocated to at least one non-graphics workload.

11. The IHS of claim 10, wherein the causing the re-allocation of the at least some of the plurality of graphics workloads from the first GPU memory subsystem to the at least one different GPU memory subsystem includes:

causing the reallocation of all of the graphics workloads that are allocated a respective memory capacity provided by the first GPU memory subsystem such that all of those graphics workloads are re-allocated to the at least one different GPU memory subsystem.

12. The IHS of claim 10, wherein the at least one non-graphics workload includes at least one of an Artificial Intelligence (AI) workload, a Machine Learning (ML) workload, and a Deep Learning (DL) workload.

13. The IHS of claim 10, wherein the respective memory capacity allocated to each of the plurality of graphics workloads includes a frame buffer capacity, and wherein the respective GPU memory subsystem utilization determined for each of the plurality of graphics workloads includes a frame buffer utilization.

14. A method for re-allocating workloads based on resource utilization, comprising:
   identifying, by a resource utilization monitoring and workload re-allocation system, a plurality of graphics workloads that are each allocated a respective memory capacity provided by one of a plurality of Graphics Processing Unit (GPU) memory subsystems included in a GPU memory system;
   determining, by the resource utilization monitoring and workload re-allocation system for each of the plurality of graphics workloads, a respective GPU memory subsystem utilization of the respective memory capacity allocated to that graphics workload;
   causing, by the resource utilization monitoring and workload re-allocation system based on the respective GPU memory subsystem utilization determined for each of the plurality of graphics workloads, a re-allocation of at least some of the plurality of graphics workloads from a first GPU memory subsystem included in the GPU memory system to at least one different GPU memory subsystem included in the GPU memory system; and
   causing, by the resource utilization monitoring and workload re-allocation system, memory capacity provided by the first GPU memory subsystem to be allocated to at least one non-graphics workload.

15. The method of claim 14, wherein the causing the re-allocation of the at least some of the plurality of graphics workloads from the first GPU memory subsystem to the at least one different GPU memory subsystem includes:
   causing the reallocation of all of the graphics workloads that are allocated a respective memory capacity provided by the first GPU memory subsystem such that all of those graphics workloads are re-allocated to the at least one different GPU memory subsystem.

16. The method of claim 14, further comprising:
   determining, by the resource utilization monitoring and workload re-allocation system for each of the plurality of graphics workloads, a respective GPU processing subsystem utilization of a GPU processing subsystem that utilizes the GPU memory subsystem that includes the respective memory capacity allocated to that graphics workload, wherein the at least some of the plurality of graphics workloads that are re-allocated from the first GPU memory subsystem to the at least one different GPU memory subsystem include a first subset of the plurality of graphics workloads that have each have a lower respective GPU processing subsystem utilization relative to a second subset of the plurality workloads.

17. The method of claim 14, further comprising:
   causing, by the resource utilization monitoring and workload re-allocation system based on the respective GPU memory subsystem utilization determined for each of the plurality of graphics workloads, a reduction of the amount of the respective memory capacity allocated to the at least some of the plurality of graphics workloads.

18. The method of claim 14, wherein the at least one non-graphics workload includes at least one of an Artificial Intelligence (AI) workload, a Machine Learning (ML) workload, and a Deep Learning (DL) workload.

19. The method of claim 14, wherein the respective memory capacity allocated to each of the plurality of graphics workloads includes a frame buffer capacity, and wherein the respective GPU memory subsystem utilization determined for each of the plurality of graphics workloads includes a frame buffer utilization.

20. The method of claim 14, further comprising:
   performing, by a GPU processing system that utilizes the GPU memory system, the plurality of graphics workloads and the at least one non-graphics workload at the same time.

* * * * *